United States Patent

[11] 3,568,642

| [72] | Inventor | Jack T. Hanby |
| | | 902 N. Springfield, Berryville, Ark. 72616 |
| [21] | Appl. No. | 854,234 |
| [22] | Filed | Aug. 29, 1969 |
| [45] | Patented | Mar. 9, 1971 |

[54] FEED HOPPER WITH DEPENDING TILTABLE FEED PAN
3 Claims, 6 Drawing Figs.

[52] U.S. Cl. ...................................................... 119/53.5, 119/55
[51] Int. Cl. .................................................... A01k 05/00
[50] Field of Search ........................................... 119/53.5, 54, 55, 70

[56] References Cited
UNITED STATES PATENTS

| 1,417,212 | 5/1922 | Smidley ........................ | 119/55 |
| 1,553,502 | 9/1925 | Boyes ........................... | 119/53.5X |
| 1,898,269 | 2/1933 | Soderstrom ................... | 119/55 |
| 2,624,311 | 1/1953 | Amstutz ........................ | 119/53.5 |

*Primary Examiner*—Hugh R. Chamblee
*Attorney*—Marvin B. Davis

ABSTRACT: A feed pan end wall pivoted to an eyebolt depended from a nut locking flanged lug on a hopper end wall. Arms on end of feed pan with spaced gap about the shank of the eyebolt. Upright slot in hopper mating end wall registering with pivot of feed pan.

PATENTED MAR 9 1971 3,568,642

INVENTOR.
JACK T. HANBY
BY Marvin C. Davis
ATTORNEY

FEED HOPPER WITH DEPENDING TILTABLE FEED PAN

BACKGROUND OF THE INVENTION

This invention relates to an improvement in feed hopper agitators responsive to the weight of a fowl; and more particularly to the economical tilting structure of a feed pan depended from a hopper.

Heretofore: U.S. Pat. Nos. 1,569,931 and 2,624,311 illustrate feed pans pivoted on bases are relatively expensive compared to my simple invention. U.S. Design Pat. No. 193,837 illustrates a feed pan which shows a stationary beam secured to the hopper end wall, and set screws and locknuts connecting with a lower beam on the feed pan end wall.

My present invention eliminates the heretofore: beam on the hopper end wall, set screws and lock nuts; and substitutes therefore a pair of small arms spaced on the wall of a feed pan with a gap space about the shank of a depending eyebolt to limit the tilting effect of the feed pan. I reduce the expense per feeder in the more simple improvement and manufacture of a feed hopper with a depending tiltable feed pan.

SUMMARY OF THE INVENTION

My feed hopper is preferably depended from a ceiling or rafter and has a depending tiltable feed pan from the hopper.

The improvement of the invention is an eyebolt pivoted to an end wall of a feed pan with the shank thereof being extended upwardly through a hole in a lug secured to the end wall of a hopper; a nut on the eyebolt shank above the lug; and a pair of arms having a means of being secured to the feed pan with a space gap about the shank of the eyebolt to limit the tiltable action of the feed pan on the pivot thereof.

A further improvement is in the provision of a flange on the mentioned lug to lock the mentioned nut against rotatable movement.

On One or more perches as a means for tilting the feed pan is provided for an occasional fowl to light thereon to agitate the feed in the hopper discharge neck opening; so that more feed will fall into the feeder pan.

A further means or like means is provided to support the opposite end wall of the feed pan.

The feed pan is usually sufficiently long enough to twist to allow independent tilting action on either end thereof.

The space gap of the arms is positioned upwardly on the shank of the eyebolt to give a more definite tilting control of the feed pan. Dash lines indicate the tilting of the feed pan.

The hopper end wall has a vertical slot to receive the pivot means of the feed pan to prevent lateral movement of the feed pan relative to the hopper; and gauge the depth of the feed on the feed pan.

DESCRIPTION OF THE PREFERRED EMBODIMENTS

Figures 1, 6:
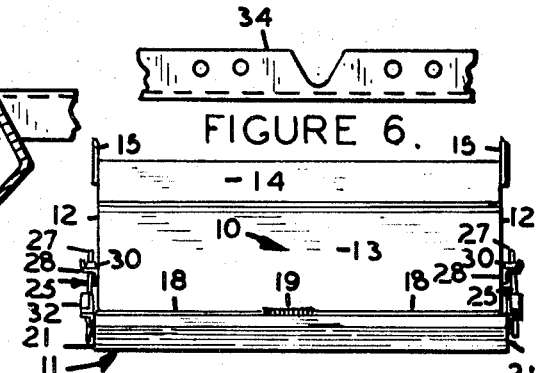
FIG. 1 is a view illustrating a longitudinal elevation of my feed hopper with a depending tiltable pan.
FIG. 6 is a view of the means for securing the upright arm flanges to an end wall of a feed pan.

A feed hopper 10 with a depending tiltable feed pan 11 is shown in FIG. 1 with both hopper end walls 12 secured to the longitudinal hopper walls 13. A removable roof 14 covers the hopper walls 12 and 13. A hanger bar 15 is secured to each hopper end wall 12. A rotatable member 16 is shown on a rod 17 to dislodge fowls when they light thereon. The rod 17 is secured to the hanger bars 15. A pair of guard wires 18 and a spring 19 are located in the feed pan opening 20 to discourage fowls from standing in the feed pan 11.

Figure 4:
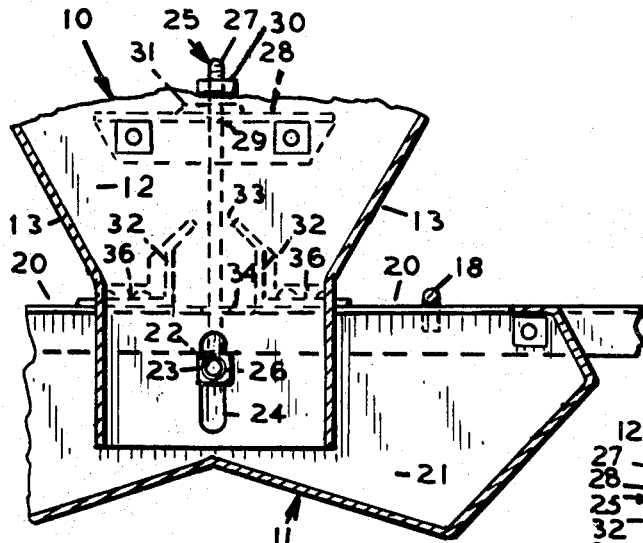
FIG. 4 is a view illustrating an enlarged fragmentary section taken on line 4—4 of FIG. 3. The hopper discharge portion is shown projected into the feed pan. The feed pan is shown depended from the hopper by the eyebolt on the far side of the hopper end wall with the eye thereof pivoted thereto. A pair of arms are shown on the far side of the hopper end wall; spaced with a gap about the shank of the eyebolt. An upright slot is shown in the end wall of the hopper with a bolt therethrough to the eye of the eyebolt and the end wall of the feeder pan as a means for lateral alignment of the hopper relative to the feed pan and the depth gauging of the feed on the feed pan.
Figure 5:
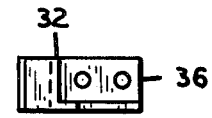
FIG. 5 is a view illustrating an enlarged plan view of one upright arm. This view is opposite hand for the opposite upright arm.
Figure 2:
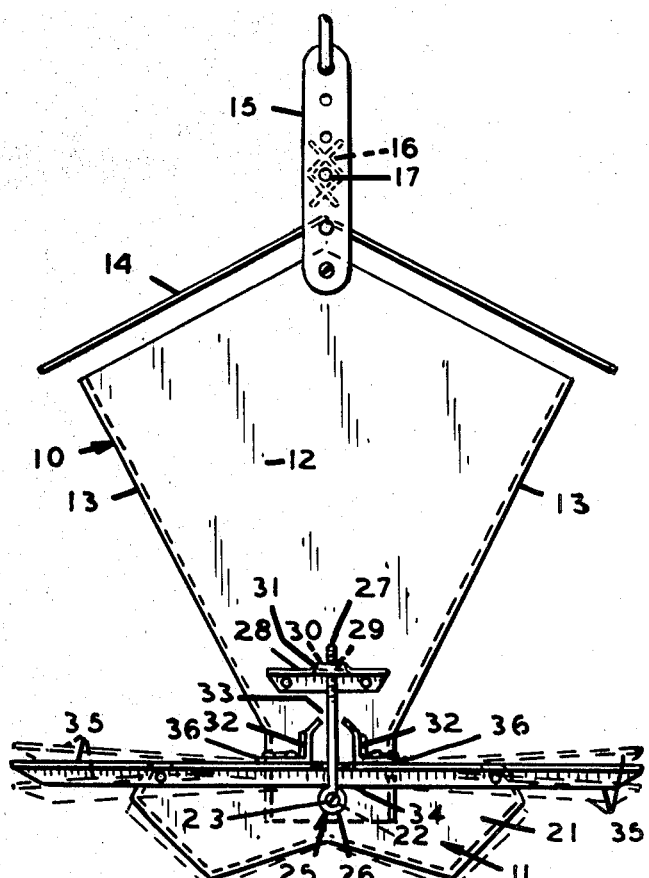
FIG. 2 is an enlarged view illustrating an end elevation of FIG. 1. Dash lines indicate the tilting of the feed pan.
Figure 3:
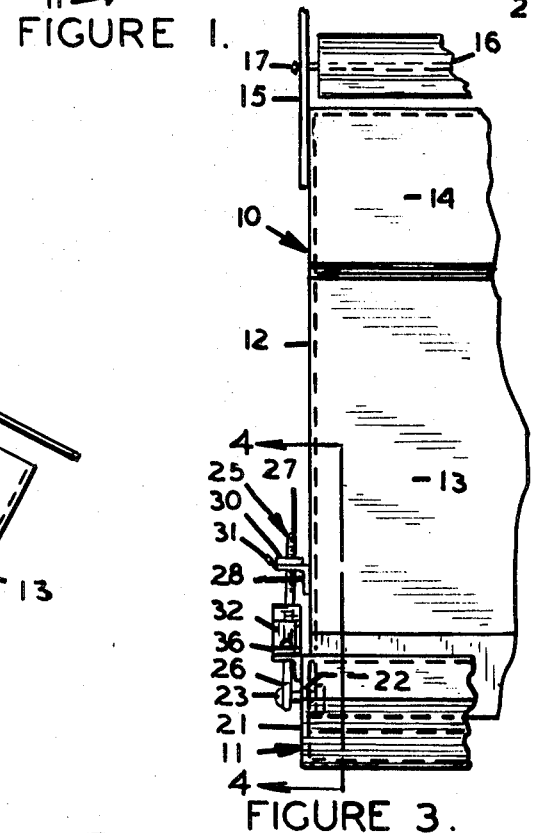
FIG. 3 is an enlarged view illustrating a longitudinal elevational fragment of an end portion of FIG. 1.

The improvement of each like end depending tiltable portions are fully illustrated in FIGS. 2, 3, and 4; and described as follows:

The feeder pan end wall 21 has a hole 22 for receiving a bolt 23. The hopper end wall 12 has an upright slot 24 to register with hole 22. An eyebolt 25 has an eye 26 thereof and is a means to be pivotal on the bolt 23. The upright slot 24 is a means for horizontal alignment of the hopper end wall 12 with the feed pan end wall 21 on the eyebolt eye 26; and a means of gauging feed on the feed pan.

The shank 27 of the eyebolt 25 extends upwardly to a lug 28 and through a hole 29 therein. A nut 30 is threaded on the shank 27 for supporting the depending eyebolt 25 on the lug 28. A locking flange 31 is formed on the lug 28 and bent upwardly to prevent the nut 30 from rotatable movement.

A pair of upright arms 32 are spaced about the eyebolt shank 27 with a space gap 33 to provide a limit means for tilting the feed pan 11 on the bolt 23. The upright arms 32 are shown with flanges 36 secured to an angle iron 34 as a means to support them on the feed pan end wall 21. The upright arms 32 may be straight and secured directly to the feed pan end wall 21 if desired as a means of being secured to the feed pan end wall 21.

The angle iron 34 is also shown as a means for perches 35 extended outwardly from each end of the feed pan wall 21. The perches 35 as a means for tilting the feed pan 11 by the weight of a fowl may be any shape and located on other portions of the feed pan 11 if desired.

I claim:

1. An improvement in a feeder agitator responsive to the weight of a fowl; the improvement in the feeder agitator comprising in combination:
   a. a hopper having at least end walls and a discharge;
   b. a feeder pan having at lease end walls;
   c. an eyebolt having an eye with a shank and a nut;
   d. said eyebolt being pivoted to one end wall of said feeder pan;
   e. said hopper having a mating end wall with an upright slot therein to retain the mentioned pivot against lateral movement;
   f. said hopper mating end wall upright slot being positioned for movement vertically on the mentioned pivot;
   g. a lug having a hole therethrough;
   h. said lug being mounted on the mentioned mating end wall of said hopper corresponding with the mentioned end wall of said feeder pan;
   i. said feeder pan having the mentioned end wall thereof depended from said lug through the hole therethrough by the nut on the shank of said eyebolt;
   j. a pair of arms;
   k. said pair of arms having a means of being secured to the mentioned end wall of said feeder pan;
   l. said pair of arms being spaced with a gap about the mentioned shank of said eyebolt to limit tiltable movement of said feeder pan wall on the pivot of said eyebolt by alternately striking the mentioned shank of said eyebolt;
   m. a second means to support the opposite end wall of said feeder pan; and
   n. a third means to tilt said feeder pan wall.

2. An improvement in a feed agitator, having a hopper and a feed pan, being responsive to the weight of a fowl; each improved end of a feed agitator comprising in combination:
   a. a lug; with a hole therethrough;

b. said lug being secured to the outside respective end wall of a hopper;
c. said lug being spaced above a feeder pan end wall;
d. an eyebolt having a shank and a nut;
e. said eyebolt having its eye pivoted to an outside end wall of a feeder pan;
f. said eyebolt having the mentioned shank thereof projected upwardly through the mentioned hole in said lug;
g. said eyebolt having the mentioned nut thereon positioned over said lug;
h. said lug having an upwardly projected flange thereon located to lock the mentioned nut against rotatable movement;
i. a pair of upright arms;
j. means to rigidly support said pair of upright arms on the mentioned end wall of a feeder pan;
k. said pair of upright arms having a space gap, with said eyebolt shank being located therein; and
l. a second means to rock said feed pan on said eyebolt pivot.

3. An improvement in a feed agitator responsive to the weight of a fowl; the improved feed agitator comprising in combination:
a. a hopper having at least sides, ends and a discharge;
b. a feeder pan;
c. said feeder pan being longer and wider than the mentioned hopper discharge opening and having at least sides and ends;
d. a pair of lugs with each having a hole therethrough;
e. each of said lugs being secured to the outside respective end wall of said hopper;
f. each of said lugs being spaced above said feeder pan end wall;
g. a pair of eyebolts having shanks and nuts;
h. each of said eyebolts having its eye pivoted to a respective end wall of said pan;
i. each of said eyebolts having a respective shank thereof projected upwardly through a respective lug;
j. each of said eyebolts having a respective nut thereon positioned over a respective lug;
k. each of said lugs having an upwardly projected flange positioned thereon to lock the respective nut against rotatable movement;
l. a pair of upright arms located on each end wall of said feeder pan;
m. means to rigidly support each pair of upright arms from each end wall of said feeder pan;
n. each of said pairs of upright arms having a normal space gap on either side of a respective eyebolt shank to limit the pivotal movement of said feeder pan wall;
o. a second means to rock said feeder pan on said eyebolt pivots; and
p. a third means to hold said eyebolt pivot against lateral movement and gauge the depth of feed in the feeder pan.